Feb. 14, 1961
T. ZABA
2,972,055
GAS TURBINE PLANT FOR THE GENERATION
OF ELECTRIC POWER
Filed May 18, 1959
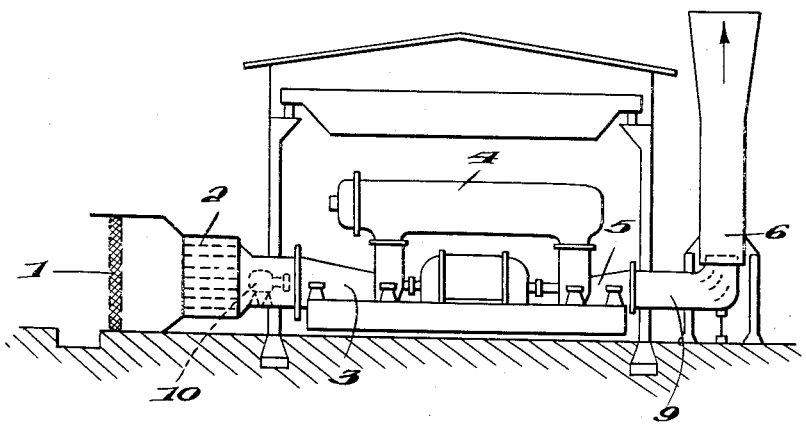

United States Patent Office 2,972,055
Patented Feb. 14, 1961

2,972,055

GAS TURBINE PLANT FOR THE GENERATION OF ELECTRIC POWER

Tadeusz Zaba, Wettingen, Switzerland, assignor to Aktiengesellschaft Brown, Boveri & Cie., Baden, Switzerland, a joint-stock company Filed May 18, 1959, Ser. No. 814,075

Claims priority, application Switzerland May 27, 1958

1 Claim. (Cl. 290—2)

In the conventional gas turbine plant the air compressor is coupled directly with the gas turbine. The effective power is tapped at the free shaft end of the air compressor or of the gas turbine. In this arrangement the conduct of the air-, combustion gas- and waste gas-lines becomes complicated and uncontrollable, resulting in high flow- and conduction losses and a great space requirement.

The invention relates to a gas turbine plant for the generation of electric power, which plant includes at least an air compressor, a combustion chamber, a gas turbine and a generator of electrical current. It is characterized in that the generator is arranged between the air compressor and the gas turbine, so that (a) air can be fed axially to the air compressor and that (b) waste gases from the gas turbine can be exhausted axially on the opposite side, before they flow into the chimney.

An embodiment of the gas turbine according to the invention is represented schematically in the single figure of the accompanying drawing.

Air is taken in and flows axially through an air filter 1 and a sound absorber 2 into an air compressor 3, and from here under increased pressure into a combustion chamber 4, which combustion chamber is shown here in horizontal position, but which can be arranged in any position. Hot gases are conducted from the combustion chamber 4 into a gas turbine 5 and leave the latter after giving up power, in axial direction through a waste gas line 9 to arrive through an adjoining chimney 6 into the open air.

Between the air compressor 3 and the gas turbine 5 a generator 7 is coupled directly and mounted with them on a common base plate 8. A starting motor 10 for the plant is arranged in the air intake of the compressor.

As can be seen from the drawing, the air filter 1, sound absorber 2, air compressor 3, generator 7, gas turbine 5 and waste gas line 9 are axially aligned. Such an arrangement results in simpler flow conditions for the air- and waste gas side, as well as for the supply- and discharge pipes of the combustion chamber 4, and consequently in shorter pipe lines with less flow- and output-losses and lower costs. The compact construction permits accommodation of the plant with optimum space utilization or the arrangement of several plants connected in parallel with a minimum of space requirement.

I claim:

Gas turbine power plant for the generation of electric power, including at least an air compressor, a combustion chamber, a gas turbine and a generator, characterized in that the generator is arranged in axial alignment between the air compressor and the gas turbine, so that air is fed axially to the air compressor and waste gases from the gas turbine are exhausted axially on the opposite side, and in that the combustion chamber is so arranged above the generator that its flow direction is parallel to the axial direction of the generator.

References Cited in the file of this patent

UNITED STATES PATENTS

| | | |
|---|---|---|
| 2,180,168 | Puffer | Nov. 14, 1939 |
| 2,459,709 | Lysholm | Jan. 18, 1949 |
| 2,566,618 | Lindsey | Sept. 4, 1951 |
| 2,881,330 | Oster | Apr. 7, 1959 |